March 7, 1961

R. A. WEBSTER 2,973,641

FORCE MEASURING APPARATUS

Filed June 26, 1957

INVENTOR.
ROBERT A. WEBSTER
BY Elliott & Pastoriza
ATTORNEYS

United States Patent Office 2,973,641
Patented Mar. 7, 1961

2,973,641

FORCE MEASURING APPARATUS

Robert A. Webster, Santa Monica, Calif., assignor to Webster Instrument, Inc., a corporation of California Filed June 26, 1957, Ser. No. 668,237

3 Claims. (Cl. 73—141)

This invention relates generally to force measuring apparatus and more particularly to an improved force measuring device of the type having flat parallel surfaces to which pressure is applied.

While the force measuring apparatus of the present invention is best adapted to measuring electrode pressures on spot welders, it is to be understood that the instrument will also find wide application in the measurement of resistance pressure for roll resistance welding machines as well as for making force measurements in forming, dimpling, and upsetting operations. In fact, the device may be used as a scale for s.mple weighing operations and is capable of indicating forces or pressure, for example, from zero to forty thousand pounds.

In the measurement of electrode pressures on spot welders, instruments now in use today usually comprise a U-shaped body or yoke structure designed to have its yoke arms positioned between the opposing electrodes of the weld.ng machine. Pressure is applied between the two yoke arms and the degree of deformation or urging together of the arms is indicated through suitable linkages by a pointer.

One difficulty in the design of force measuring devices of this type is the problem of providing a yoke structure of sufficient strength to yield relatively high force readings and yet fit between the electrodes. Further, it is essential in such instruments that the electrodes be positioned on the yoke arms at precisely located points in order to insure consistent readings.

In an effort to solve the problem of providing a force measuring insrtument which will yield relatively high force readings and yet fit between the electrodes of a welding machine, it has been proposed to provide a disc-shaped body having a thickness dimension which is appreciably less than half the diameter of the body whereby it may be readily positioned between the opposing electrodes of the welding machine. The body itself comprises a cylinder co-operating with a relatively large diameter piston head. Pressure is applied between two parallel flat surfaces, one surface comprising one end of the piston member, and the other surface the base of the cylindrical disc-shaped body. Hydraulic fluid is provided in the cylindrical body beneath the piston head and this fluid is communicated to an associated pressure gauge so that the force or pressure applied to the top of the piston will be reflected by an increased pressure in the hydraulic fluid and a corresponding indication on the gauge. Because of the relatively large diameter chamber used, the axial movement of the piston need be only very slight to transfer sufficient fluid from the device to actuate the indicator and thus high forces may be indicated notwithstanding the instrument is relatively thin.

One of the primary mechanical difficulties in the above proposed design, is the problem of binding of the p:ston head during its small axial movement within the cylinder as a result of off-center application of the electrodes. This problem is particularly acute when the diameter of the piston head is large relative to the axial movement of the piston. The differences in frictional forces between the outer annular surfaces of the piston head and the inner cylindrical wall together with the off-center force of the electrodes are such as to establish moments tending to move the axis of the piston head out of co-axial and concentric relationship with respect to the axis of the cylindrical body. These moments are relatively large because of the relatively large diameter of the piston head, and tend to cause a binding of the piston head within the cylinder. As a consequence of such binding, consistent force readings are difficult to achieve. As a further consequence of binding, while axial movement may still take place notwithstanding a slight tilting of the piston axis with respect to the cylinder axis, the frictional engagement of the piston with the cylinder walls is altered which in turn gives rise to erroneous force readings.

In the measurement of electrode pressures for spot welding machines, it is important that the current for the welding machine be turned off before any attempt is made to make a force measurement. Most present day force measuring devices are constructed of metal and a serious accident could occur if the current were accidentally left on or the machine were left in an energized state during a force measurement.

Bearing the above problems in mind, it is a primary object of the present invention to provide an improved force measuring apparatus of hydraulic type adapted to fit between welding electrodes, in which binding of the piston head within the associated cylinder is substantially eliminated notwithstanding the overall thickness of the instrument is relatively small compared with the diameter thereof and the fact that the electrodes may not be exactly centered on the apparatus.

More particularly it is an object to provide a force measuring instrument in which friction as a result of sliding contact of the piston within the cylinder due to axial movement thereof, is appreciably reduced.

Another object is to provide a force measuring instrument which will accurately indicate forces notwithstanding off center positioning of the electrodes whereby more rapid measurements can be made and careful pre-adjustment is unnecessary.

Still another object of the invention is to provide an apparatus of the above type including insulation about one of the pressure contact surfaces whereby there is no possibility of an accident occurring during a force measurement should the machine tested be accidentally left in an energized state.

These and many other objects and advantages of the present invention are attained briefly, by providing a unique piston construction for co-operation in a cylindrical body. More particularly, the piston is provided with reduced end portions which serve with the inner cylindrical walls of the co-operating body portion, to define annular spaces. Within these annular spaces there are provided ball bearings. By this arrangement, sliding friction of movement of the piston within the cylinder is greatly reduced. Further, the use of hardened steel ball bearings within suitably lined races substantially prevents any possibility of misalignment of the axis of the piston head with respect to that of the cylinder whereby the binding problem as a result of such friction and off-center loading is wholly eliminated. By providing a suitable insulating ring and base disc about the contact surface of the piston, this surface is effectively electrically insulated.

A better understanding of the invention and its various features and advantages will be had by referring to the accompanying drawings illustrating a preferred embodiment thereof, and in which.

Figure 1:
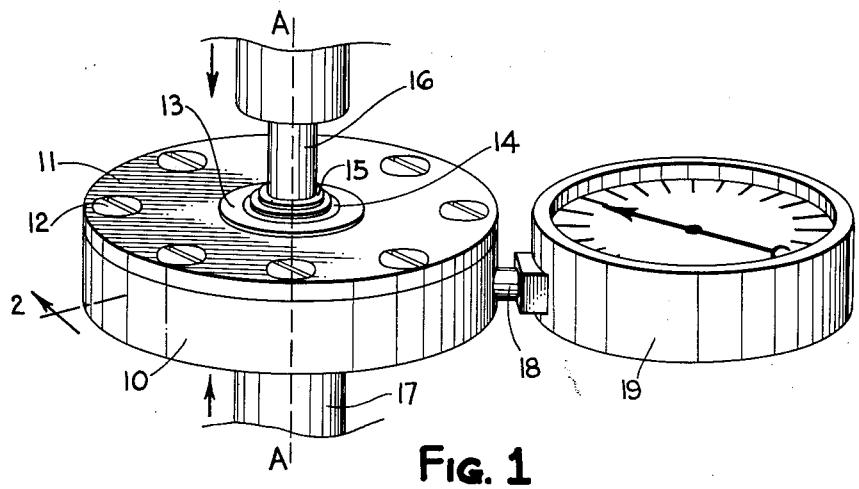
Figure 1 is an overall perspective view illustrating the assembled force measuring apparatus in position for taking a measurement between the electrodes of a resistance spot welding machine.

Referring first to Figure 1, the force measuring apparatus comprises basically a body member 10 of cylindrical disc shape provided with a cover plate 11 secured to the body 10 by suitable screws 12. Within the body there is provided a piston having an upper end portion visible at 13. This upper end of the piston includes an insulating ring 14 and a contact pressure plate 15. As shown in Figure 1, the device is positioned between the electrodes 16 and 17 of a typical spot welding machine for measuring the pressure exerted between these electrodes when moved towards each other as indicated by the opposing upper and lower arrows.

The cylindrical body 10 is filled with hydraulic fluid such as oil and includes a communicating passage 18 connected to a gauge or meter 19 responsive to fluid pressure. Upon depression of the upper end portion of the piston 13 by the moving together of the electrodes 16 and 17, hydraulic fluid will flow through the connecting conduit 18 and thus cause a reading to be indicated on the meter 19. Preferably, the meter 19 is calibrated directly in pounds and in typical embodiments pressures from zero to forty thousand pounds can be accurately indicated.

As shown in Figure 1, the vertical axes of the cylindrical body 10 and piston 13 are co-axial as indicated at A—A. In order that accurate measurements may be made, it is essential that the axis of the piston 13 remain in concentric co-axial relationship with respect to the axis of the cylindrical body 10. Any tilting or misalignment of one axis with respect to the other results in binding of the piston within the cylinder and the chances of such binding occurring are particularly favorable when the actual axial movement of the piston is small compared with its transverse dimensions.

Figure 2:
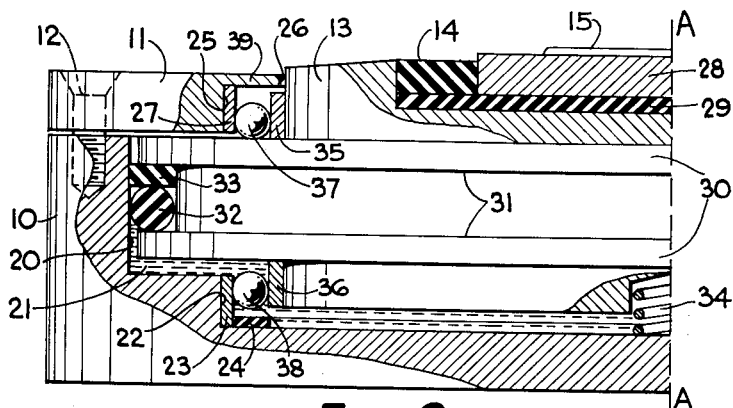
Figure 2 is an enlarged cutaway sectional view of a portion of the force measuring apparatus taken in the direction of the arrow 2 of Figure 1 and showing the piston in a first position.

The manner in which the improved force measuring apparatus of the present invention is constructed in order to overcome the problem of binding and friction as a result of off-center loading will best be understood by reference to Figure 2 which illustrates an enlarged partial cross section of one-half of the cylindrical body 10 and cover 11. Since the instrument is entirely symmetrical with respect to the vertical axis A—A, only this half section is deemed necessary to illustrate the invention. As shown in Figure 2, the cylindrical body 10 includes a first recessed portion 20 of a first given diameter. Normally, this recessed portion is filled with hydraluic fluid such as indicated at 21. The first recessed portion is concentric with a second recessed portion 22 of a second given diameter, less than the first given diameter. An annular bearing ring of hardened steel 23 lines the side walls of the second recessed portion 22 as shown. There is also provided a washer shaped rubber element 24 positioned on the floor of this second recessed portion adjacent its periphery.

The cover member 11 similarly includes a recessed portion 25 of diameter, in the embodiment illustrated in Figure 2, equal to the second given diameter of the second recessed portion 22. While these diameters are shown as equal, it is not necessary that the recessed portion in the cover plate 11 be of the same diameter as the recessed portion 22 but only that the axes of these recessed portions be concentric. The central upper portion of the cover 11 is provided with an opening 26 through which one end portion of the piston 13 extends. The inner wall of the cover recessed portion 25 is similarly lined with a bearing ring 27 of hardened steel. The upper end portion 13 includes, in addition to the annular insulating ring 14, a backing metal block 28 seated on an insulating disc 29. By this arrangement, the pressure contact plate 15 transmits forces to the piston through the backing block 28 and insulating disc 29 so that the electrode in contact with plate 15 is wholly electrically insulated from the remainder of the cover 11 and body 10.

The piston member 13 co-operating with the cylindrical body 10 and cover plate 11 also includes an intermediate enlarged diameter head portion 30 provided with an enlarged annular groove 31 within which are provided a conventional O-ring 32 and backing 33. By this arrangement, the piston engages the side walls of the first recessed portion 20 of the cylindrical body 10 in fluid tight engagement. This piston 13 is normally biased upwardly against the cover plate 11 by a central compression spring 34 disposed within a receiving bore in the lower end portion of the piston 13 to bear against the bottom of the second recess 22. As illustrated in Figure 2, the piston is shown in this biased position with the upper end of the piston head 30 abutting the undersurface of the cover plate 11. It will be noted that the upper and lower end portions of the piston are of reduced diameter less than the second given diameter of the recessed portion 22 and the recessed portion 25 such that annular spaces are defined by these reduced diameter end portions. Similar bearing rings of hardened steel 35 and 36 may be provided about these upper and lower end portions of the piston in opposing relationship with respect to the bearing rings 23 and 27. A plurality of ball bearings as indicated at 37 and 38 are positioned in these annular spaces.

Figure 3:
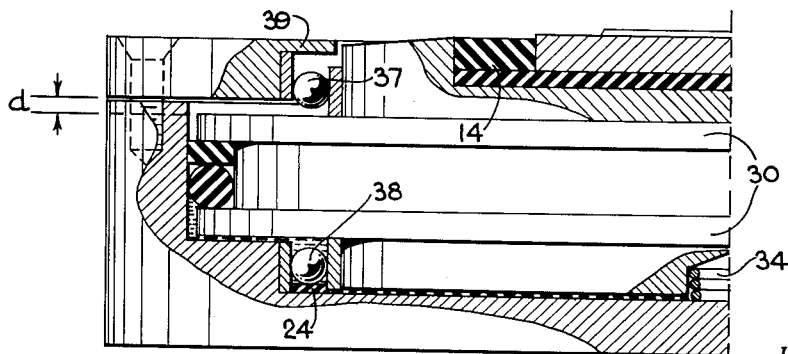
Figure 3 is a view similar to Figure 2 illustrating the piston in a second position.

As mentioned heretofore, in force measuring instruments of the type under consideration, the axial movement of the piston is relatively small compared with the overall diametric dimensions of the piston and cylinder. Figure 3 illustrates the position of the piston head 30 when maximum force has been applied to the pressure contact plate 15 and the bottom of the cylindrical body 10. It will be noted that the piston head has been moved axially downwardly only a distance indicated by the letter $d$ in Figure 3. It will be readily appreciated, therefore, that in the event of off-center application of the electrodes the friction of the O-ring and backing in the annular groove of the piston head with respect to the cylindrical side walls of the recessed portion 20 together with the off-center action will tend to set up force moments having radius arms that are long compared with the axial movement of the piston head such that binding could easily occur. The provision of the reduced diameter end portions of the piston head 30 together with the recessed portions defining the annular spaces within which ball bearings are positioned will overcome any such binding tendency. Thus, it will be evident that during movement of the piston 13 from the position shown in Figure 2 to the position shown in Figure 3, the ball bearings 37 and 38 bearing against the bearing rings associated therewith, respectively, serve to maintain the piston in coaxial alignment with the axis of the cylinder throughout its entire travel notwithstanding off-center force applications of the electrodes. Further, sliding friction is converted to a rolling friction. Inasmuch as the ball bearings themselves are of hardened steel, the concentric and co-axial relationship of the piston axis and that of the cylinder are necessarily maintained.

The function of the rubber type washer 24 illustrated in Figures 2 and 3 is to enable the ball bearings 38 upon downward movement of the piston head 31 to imbed themselves if necessary in this rubber such that no sliding will result and all movement will be accommodated by rolling of the ball bearings on the bearing rings. With respect to the upper ball bearings, gravity normally causes these bearings to assume the position illustrated in Figure 2. The opening 26 in the upper portion of the cover 11 is, as shown, of lesser diameter than the inner diameter of the recessed portion 25 whereby a resulting radially inwardly directed flange 39 is effectively defined which confines the ball bearings 37 in the upper annular space.

The operation of the force measuring apparatus of this invention will be evident from the above description. Normally, the piston 30 is in the position illustrated in Figure 2 and the ball bearings 37 will assume a position wherein they are resting on the top surface of the piston head. The lower ball bearings 38, on the other hand, may be in a slightly elevated position or could also be resting lightly on top of the rubber washer pad 24. When the piston pressure plate 15 and bottom surface of the cylindrical body 10 are disposed between the electrodes 16 and 17 of a spot welding machine, the force exerted between these electrodes upon movement thereof towards each other will depress the piston 30 within the cylindrical recessed portion 20 thereby forcing the hydraulic fluid 21 through the connecting passage 18 to the meter 19. The pressure of this fluid will be indicated by the meter 19, which as stated heretofore, may be calibrated to read directly in pounds. The electrodes will be insulated from each other by the insulation ring 14 and base disc 29.

During the axial movement of the piston head 30 from the position shown in Figure 2 towards the position shown in Figure 3, the upper ball bearings 37 will tend to rotate or roll in a clockwise direction as viewed in Figures 2 and 3 such that their final position will be substantially as illustrated in Figure 3. Similarly, the lower ball bearings 38 will tend to roll in a clockwise direction as viewed in Figure 2 to assume the position illustrated in Figure 3. Should the ball bearings be initially seated on the rubber washer pad 24, this described motion of the piston will result in their embedding themselves slightly in the rubber washer pad to depress the same. This resilient give of the pad insures that only a rolling action will result during axial movement of the piston and that no sliding will take place. Any sliding engagement between the balls and the bearing ring races will establish unnecessary friction.

After the pressure has been recorded, as indicated on the meter 19, the electrodes 16 and 17 are separated and the instrument removed. The central compression spring 34 will serve to move the piston head 30 up to the position illustrated in Figure 2 wherein the upper end surface of the piston head 30 seats against the undersurface of the cover 11.

It should be noted from the design of the cylindrical body 10 and piston 13 that in the event the forces applied to the apparatus exceed those for which the apparatus and associated meter have been calibrated, the lower end surface of the piston head 30 will simply seat on the annular ledge between the recessed portion 20 and recessed portion 22. The movement of the piston is thus checked and extreme forces will not damage the apparatus or associated indicating equipment.

From the foregoing description, it will be evident that the present invention provides a greatly improved force measuring apparatus in which any binding tendency and unnecessary friction is substantially eliminated. Further, there is no possibility of short circuits and the like since the contact pressure points are insulated from each other. Modifications within the scope and spirit of the present invention will readily occur to those skilled in the art. The force measuring apparatus is, therefore, not to be thought of as limited to the particular embodiment set forth and described for illustrative purposes.

What is claimed is:

1. A force measuring apparatus comprising: a body having a first recessed portion of a first given diameter and a second recessed portion co-axial and concentric with said first portion of a second given diameter less than said first given diameter; a piston member having an intermediate piston head of larger diameter than the remaining upper and lower portions of said piston member; said intermediate piston head being fitted in fluid tight relationship within said first recessed portion in co-axial relationship, said lower portion of said piston member extending into said second recessed portion and of a diameter less than said second given diameter to define a lower annular space; a cover member for said body, said cover member having a recessed portion concentric with said body adapted to receive the upper portion of said piston member and define with the annular walls of said upper portion an upper annular space, said cover having a central opening exposing the top of said piston member; ball bearings substantially filling said upper and lower annular spaces so that vertical movement of said piston within said first recessed portion is confined to the direction of the vertical axis of said body; and an annular resilient washer shaped pad positioned on the floor adjacent the annular wall of said second recessed portion upon which said ball bearings in said lower annular space may rest, said second recessed portion having an outlet means for connection to a fluid pressure gauge, so that when said second recessed portion is filled with hydraulic fluid, said fluid transmits force applied to said upper portion of said piston member to said pressure gauge.

2. A force measuring apparatus comprising: a body having a first recessed portion of a first given diameter and a second recessed portion co-axial and concentric with said first portion of a second given diameter less than said first given diameter; a piston member having an intermediate piston head of larger diameter than the remaining upper and lower portions of said piston member; said intermediate piston head being fitted in fluid tight relationship within said first recessed portion in co-axial relationship, said lower portion of said piston member extending into said second recessed portion and of diameter less than said second given diameter to define a lower annular space; a cover member for said body, said cover member having a recessed portion concentric with said body adapted to receive the upper portion of said piston member and define with the annular walls of said upper portion an upper annular space, said cover having a central opening exposing the top of said piston member, said upper portion of said piston member including a pressure contact surface and backing block positioned radially inwardly from said upper annular space; electrical insulating means positioned about and under said contact surface and backing block to insulate the same from the remaining portions of said piston member; and ball bearings substantially filling said upper and lower annular spaces so that vertical movement of said piston within said first recessed portion is confined to the direction of the vertical axis of said body, said second recessed portion having an outlet means for connection to a fluid pressure gauge, so that when said second recessed portion is filled with hydraulic fluid, said fluid transmits force applied to said upper portion of said piston member to said pressure gauge.

3. A force measuring apparatus comprising: a body having a recessed portion of given diameter; a piston member fitted in fluid tight relationship within said recessed portion in co-axial relationship; a cover member for said body having a central opening exposing the top of said piston member, said piston member having upper and lower reduced diameter portions defining upper and lower annular spaces with respect to said recessed portion in said body; and ball bearings substantially filling said upper and lower annular spaces so that vertical movement of said piston member within said recessed portion is confined to the direction of the vertical axis of said body; and an annular resilient washer shaped pad positioned on the floor of said recessed portion upon which said ball bearings in said lower annular space may rest, the lower reigon of said recessed portion having an outlet means for connection to a fluid gauge so that when said portion is filled with hydraulic fluid, said fluid transmits force applied to the upper portion of said piston member to said pressure gauge.

References Cited in the file of this patent

UNITED STATES PATENTS

| | | |
|---|---|---|
| 1,865,446 | Sears | July 5, 1932 |
| 2,472,047 | Ruge | May 31, 1949 |
| 2,597,923 | Croston | May 27, 1952 |
| 2,643,781 | Wise | June 30, 1953 |

FOREIGN PATENTS

| | | |
|---|---|---|
| 564,287 | England | Sept. 21, 1944 |